(12) United States Patent
D'Amico et al.

(10) Patent No.: US 9,398,272 B2
(45) Date of Patent: Jul. 19, 2016

(54) LOW-PROFILE LENS ARRAY CAMERA

(71) Applicant: Google Inc., Mountain View, CA (US)

(72) Inventors: Sam D'Amico, Menlo Park, CA (US);
Xiaoyu Miao, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 811 days.

(21) Appl. No.: 13/671,277

(22) Filed: Nov. 7, 2012

(65) Prior Publication Data
US 2014/0125810 A1  May 8, 2014

(51) Int. Cl.
*H04N 9/04* (2006.01)
*H04N 5/225* (2006.01)
*H04N 5/232* (2006.01)
*H04N 5/33* (2006.01)

(52) U.S. Cl.
CPC ............. *H04N 9/045* (2013.01); *H04N 5/2258* (2013.01); *H04N 5/232* (2013.01); *H04N 5/332* (2013.01)

(58) Field of Classification Search
CPC ..... H04N 5/2258; H04N 5/232; H04N 5/332; H04N 9/045
See application file for complete search history.

(56) References Cited

U.S. PATENT DOCUMENTS

| | | | | |
|---|---|---|---|---|
| 5,768,023 A * | 6/1998 | Sawaki | ..................... | B41J 2/465 359/622 |
| 6,057,538 A * | 5/2000 | Clarke | ............. | H01L 27/14623 250/208.1 |
| 6,069,350 A * | 5/2000 | Ohtsuka | ............ | H01L 27/14621 250/208.1 |
| 6,125,197 A * | 9/2000 | Mack | ..................... | G06T 7/0057 256/12 |
| 6,211,521 B1 * | 4/2001 | Bawolek | ................ | G02B 5/201 250/208.1 |
| 7,662,656 B2 * | 2/2010 | Ford | .................. | H01L 27/14623 438/48 |
| 7,880,794 B2 | 2/2011 | Yamagata et al. | | |
| 8,139,125 B2 | 3/2012 | Scherling | | |
| 8,189,065 B2 | 5/2012 | Georgiev et al. | | |
| 2001/0036014 A1 * | 11/2001 | Sasano | ................. | G02B 3/0018 359/619 |
| 2002/0079491 A1 * | 6/2002 | Raynor | ............. | H01L 27/14627 257/59 |
| 2002/0113888 A1 * | 8/2002 | Sonoda | ............ | H01L 27/14601 348/315 |
| 2002/0154347 A1 * | 10/2002 | Funakoshi | ........... | H04N 3/1562 358/513 |

(Continued)

OTHER PUBLICATIONS

Lytro, Inc.; Retrieved Nov. 5, 2012, from https://www.lytro.com/camera (13 pages).

(Continued)

*Primary Examiner* — Sath V Perungavoor
*Assistant Examiner* — Peter D Le
(74) *Attorney, Agent, or Firm* — Blakely Sokoloff Taylor & Zafman LLP

(57) ABSTRACT

An imaging device includes an image sensor and an array of wafer lenses. The image sensor has rows and columns of pixels partitioned into an array of sensor subsections. The array of wafer lenses is disposed over the image sensor. Each of the wafer lenses in the array of wafer lenses is optically positioned to focus image light onto a corresponding sensor subsection in the array of sensor subsections. Each sensor subsection includes unlit pixels that do not receive the image light focused from the wafer lenses and each sensor subsection also includes lit pixels that receive image the image light focused by the wafer lenses. A rectangular subset of the lit pixels from each sensor subsection are arranged to capture images.

23 Claims, 8 Drawing Sheets

(56) References Cited

U.S. PATENT DOCUMENTS

| | | | | |
|---|---|---|---|---|
| 2003/0042490 A1* | 3/2003 | Yamamoto | H01L 27/14685 | 257/72 |
| 2003/0063390 A1* | 4/2003 | Brown | G02B 3/0043 | 359/619 |
| 2004/0041794 A1* | 3/2004 | Kidode | G06F 1/163 | 345/173 |
| 2005/0280012 A1* | 12/2005 | Boettiger | B29D 11/00278 | 257/88 |
| 2006/0131767 A1* | 6/2006 | Wake | B29C 43/021 | 264/1.32 |
| 2006/0171696 A1* | 8/2006 | Murata | G02B 3/14 | 396/72 |
| 2007/0153335 A1* | 7/2007 | Hosaka | H04N 1/58 | 358/463 |
| 2008/0007804 A1* | 1/2008 | Min | H04N 3/1587 | 358/512 |
| 2008/0290435 A1* | 11/2008 | Oliver | B29D 11/00375 | 257/432 |
| 2008/0315104 A1* | 12/2008 | Nam | H01L 27/14603 | 250/370.08 |
| 2009/0075838 A1* | 3/2009 | El Gamal | B01L 3/502715 | 506/12 |
| 2009/0127440 A1* | 5/2009 | Nakai | G02B 3/0012 | 250/227.2 |
| 2009/0160737 A1* | 6/2009 | Wu | G02B 27/017 | 345/8 |
| 2009/0160997 A1* | 6/2009 | Oyama | H04N 5/2254 | 348/340 |
| 2009/0230394 A1* | 9/2009 | Nagaraja | H01L 27/14621 | 257/59 |
| 2009/0242735 A1* | 10/2009 | Masuyama | H01L 27/14632 | 250/208.1 |
| 2009/0256931 A1* | 10/2009 | Lee | H01L 24/97 | 348/231.99 |
| 2009/0268983 A1* | 10/2009 | Stone | H04N 3/1593 | 382/284 |
| 2011/0080487 A1 | 4/2011 | Venkataraman et al. | | |
| 2011/0279721 A1* | 11/2011 | McMahon | H04N 5/345 | 348/302 |
| 2012/0188391 A1* | 7/2012 | Smith | H04N 5/2258 | 348/222.1 |

OTHER PUBLICATIONS

Heptagon Advanced Micro-Optics Pte Ltd, © 2011; "Wafer Level Technology," Retrieved Nov. 5, 2012, from http://www.hptg.com/technology/wafer-level-technology (1 page).

Pelican Imaging Corporation, © 2012; Retrieved Nov. 5, 2012, from http://www.pelicanimaging.com/ (1 page).

\* cited by examiner

LOW-PROFILE LENS ARRAY CAMERA

TECHNICAL FIELD

This disclosure relates generally to optics, and in particular but not exclusively, relates to digital imaging.

BACKGROUND INFORMATION

Conventional digital imaging devices or cameras have a lens (which may include multiple lens elements) that focuses image light onto an image sensor that measures the image light and generates an image based on the measurements. FIG. 1 illustrates a common configuration for a digital imaging device 100. FIG. 1 includes an image sensor 101 and optical efficiency lenses 110 disposed over image sensor 101. Optical efficiency lenses 110 function to draw as much light as possible into the pixels for measurement. Optical efficiency lenses 110 may be microlenses disposed over each pixel of image sensor 101. An infrared ("IR") filter 115 may be disposed over optical efficiency lenses 110 and image sensor 101 to filter out IR light from being measured by image sensor 101. Lens 120 is disposed over image sensor 101 to focus image light 190 onto the pixels of image sensor 101. Lens 120 may include convex and/or concave lens elements 123 that give lens 120 a certain focal length. The focal length of lens 120 may correspond with a Depth of Field. Depth of Field refers to the range of distances in the field of view of an image sensor that appear to be well focused in an image captured by image sensor 101.

Conventional digital imaging devices may have a lens such as lens 120 with a Z axis 121. The size of image sensor 101 and the corresponding size of the image plane that lens 120 focuses image light 199 on may influence the depth of Z axis 121. The image plane and corresponding depth of Z axis 121 to achieve a high resolution image may be relatively large. A larger depth of Z axis 121 may limit the applications or uses of digital imaging device 100, because of space constraints. Therefore, a device or method that allows a digital imaging device to capture high resolution images with a reduced lens depth (Z axis) would be advantageous.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for generating an image are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
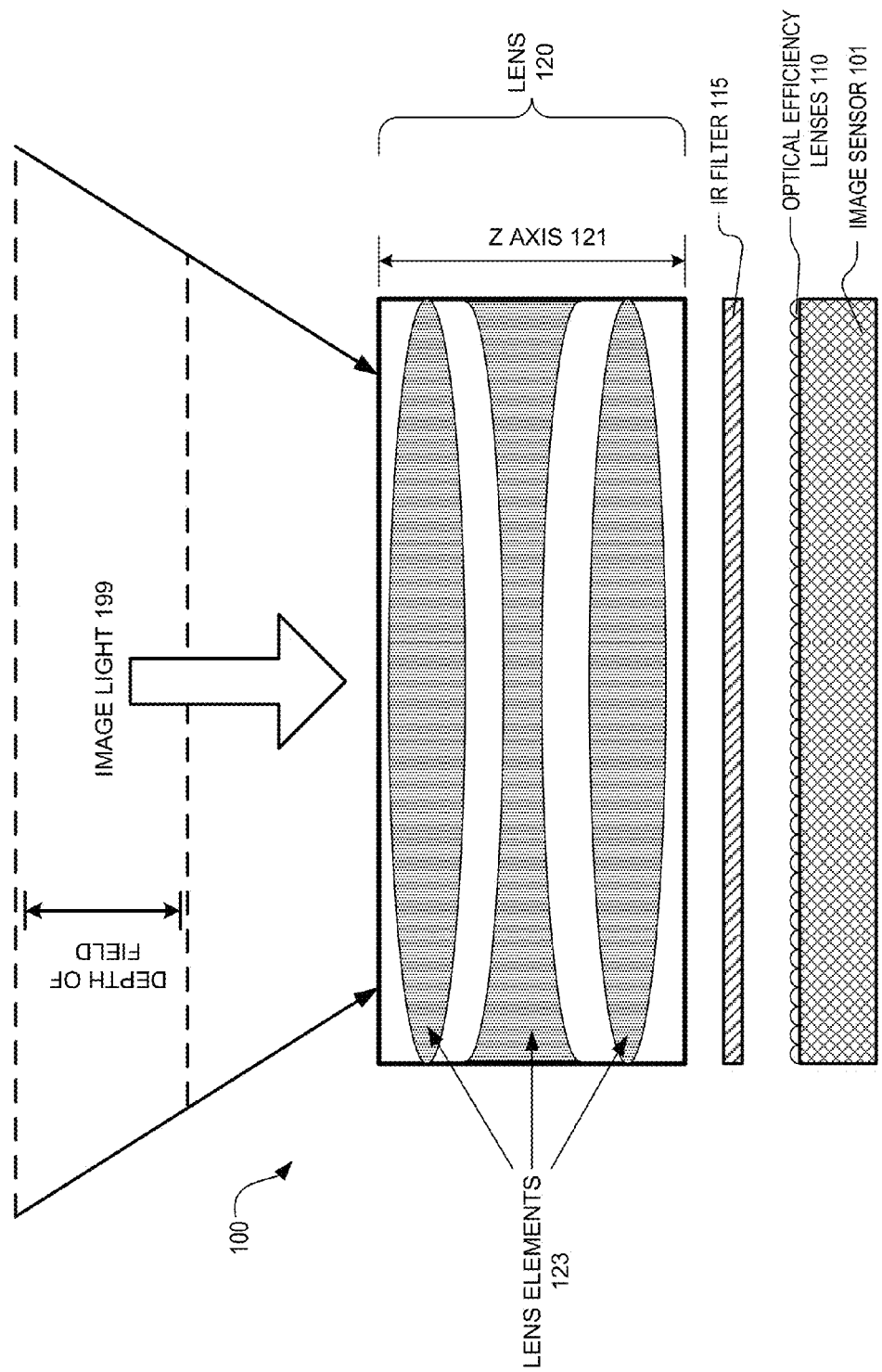
FIG. 1 is a side view of a conventional imaging device that includes a lens focusing image light onto an image sensor.
Figure 2:
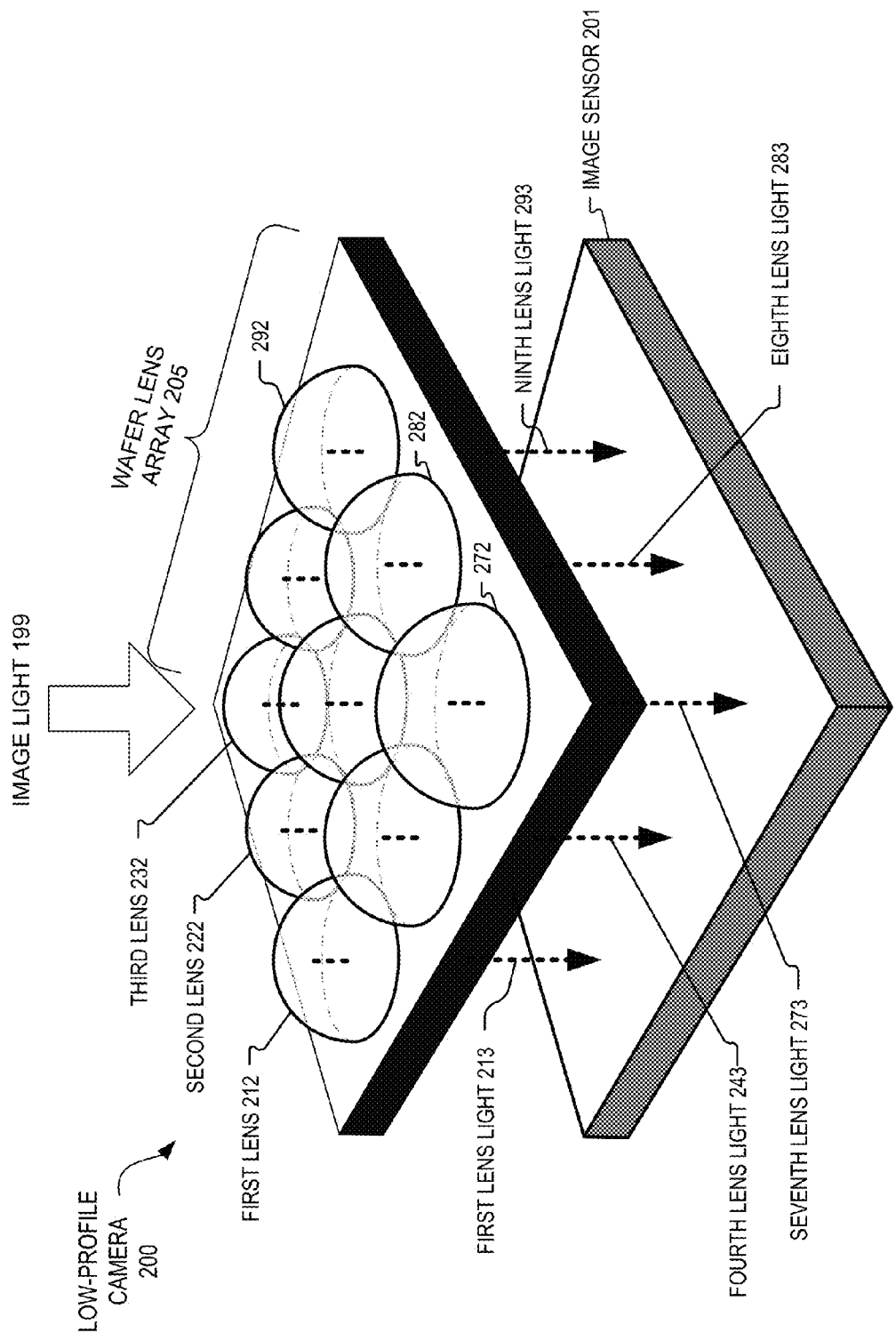
FIG. 2 illustrates an example wafer lens array focusing image light onto an image sensor, in accordance with an embodiment of the disclosure.

FIG. 2 illustrates an example low-profile camera 200 that includes a wafer lens array 205 focusing image light 199 onto an image sensor 201, in accordance with an embodiment of the disclosure. Image sensor 201 includes rows and columns of image pixels. Image sensor 201 may be a conventional, off-the-shelf Complementary Metal-Oxide-Switch ("CMOS") image sensor having millions of pixels (e.g. 5, 8, or 12 megapixel). The CMOS image sensor may have line-by-line readouts and have a rolling shutter. In the illustrated embodiment, wafer lens array 205 has nine lenses arranged in a 3×3 matrix. Of course, 2×2, 2×3, 4×4, 4×3, 5×5 and other matrix arrangements are possible. Each lens in wafer lens array 205 may have additional, known optics (not illustrated) such as additional filters and lenses.

Figure 3:
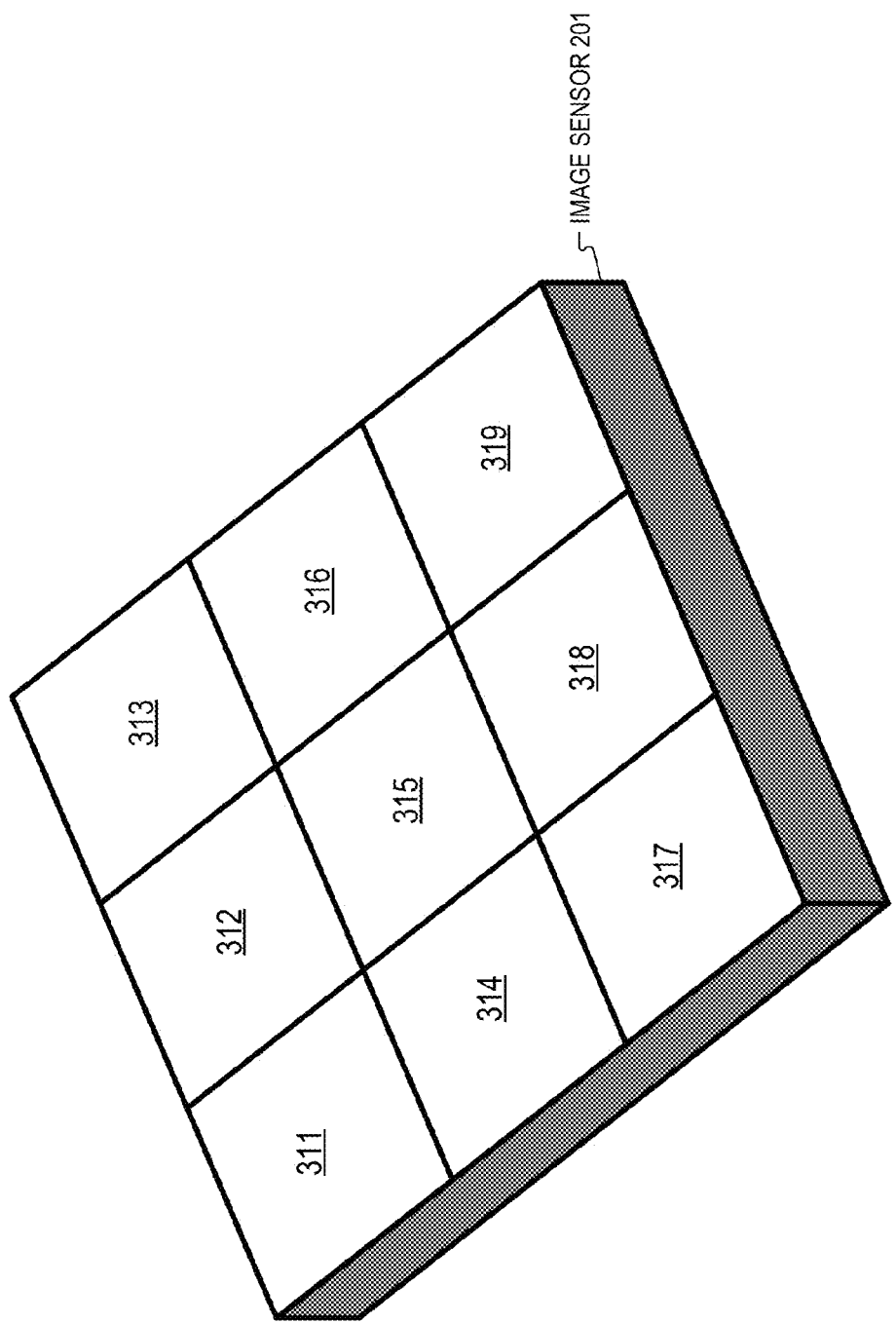
FIG. 3 illustrates an image sensor partitioned into sensor subsections, in accordance with an embodiment of the disclosure.

Directing attention to FIG. 3, image sensor 201 may be partitioned into sensor subsections. In the illustrated embodiment, image sensor 201 includes first sensor subsection 311, second sensor subsection 312, third sensor subsection 313, fourth sensor subsection 314, fifth sensor subsection 315, sixth sensor subsection 316, seventh sensor subsection 317, eighth sensor subsection 318, and ninth sensor subsection 319. The first through ninth sensor subsections are arranged in a 3×3 matrix. Each sensor subsection includes the pixels in the area of the sensor subsections. The pixel data received from the pixels in the certain sensor subsection may be grouped together in software/firmware, after reading out the pixels from image sensor 201. Image sensor 201 can be partitioned into a different number of sensor subsections depending on the number of lens in the wafer lens array. For example, image sensor 201 may only be partitioned into four sensor subsections if only four lenses are in the wafer lens array.

Returning to FIG. 2, first lens 212 in wafer lens array 205 focuses first lens light 213 onto first sensor subsection 311 of image sensor 201, second lens 222 focuses second lens light (not illustrated) onto second sensor subsection 312 of image sensor 201 ... and ninth lens 292 focuses ninth lens light 293 onto ninth sensor subsection 319. In other words, each of the wafer lenses in wafer lens array 205 is optically positioned to focus image light on its corresponding sensor subsection.

Wafer lens array 205 may include multiple wafers stacked on top of each other so that the first through ninth lenses in wafer lens array 205 have multiple lens elements that make up each lens. In this case, first lens light 213 would propagate through the multiple lens elements of the lens in the Z axis of the lens. Using wafer lens technology in wafer lens array 205 may give low-profile camera 200 a substantially smaller Z axis dimension than a conventional camera. Wafer lenses used in wafer lens array 205 may be purchased from Heptagon™. In one embodiment the lenses in wafer lens array 205 have an f-number of f/2.5. It is appreciated that additional filters and optics (not shown in FIG. 2) may be included in low-profile camera 200.

Figure 4:
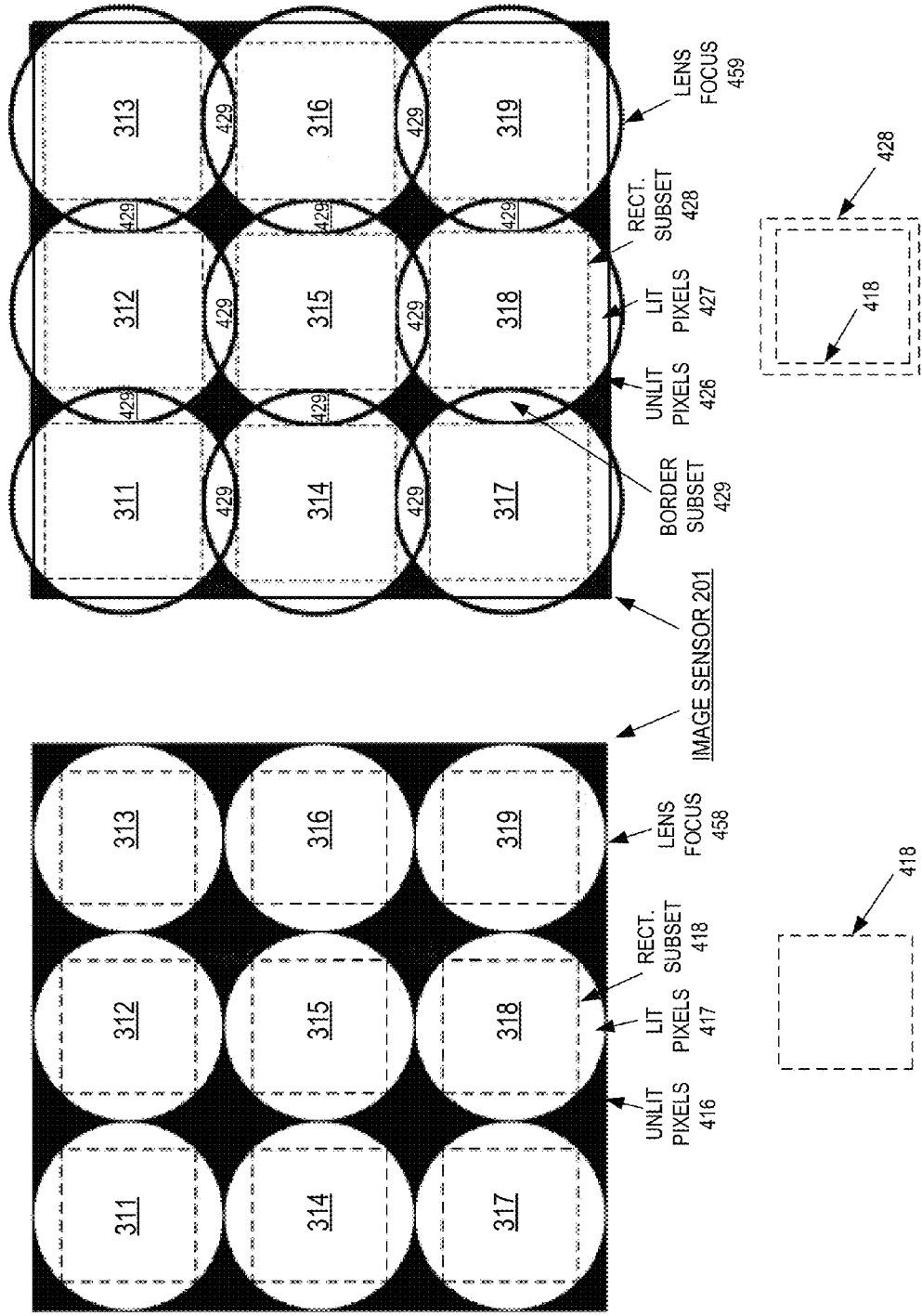
FIGS. 4A and 4B show possible examples of how lenses in a wafer lens array could be configured to focus image light onto sensor subsections of an image sensor, in accordance with an embodiment of the disclosure.

FIGS. 4A and 4B show possible examples of how lenses in a wafer lens array 205 could be configured to focus image light 199 onto sensor subsections of image sensor 201, in accordance with an embodiment of the disclosure. FIG. 4A illustrates image sensor 201 and its nine sensor subsections 311-319 being lit by their corresponding lenses in wafer lens array 205, focusing image light 199 onto their respective sensor subsections (e.g. third lens 232 focuses image light 199 onto sensor subsection 313). The portion of each sensor subsection that is lit (i.e. pixel in the sensor subsection that receive image light 199 focused from their respective wafer lens in wafer lens array 205) is shown in white, inside lens focus circle 458. The pixels that are lit in each sensor subsection are labeled as lit pixels 417. The portion of each sensor subsection that is not lit (i.e. pixel in the sensor subsection that do not receive image light 199 focused from their respective wafer lens in wafer lens array 205) is shown in black. Unlit pixels 416 are the pixels in each sensor subsection that are unlit. Rectangle subsection 418 is a rectangular subsection of lit pixels 417. The pixel in rectangular subsection 418 are arranged to capture images.

The nine rectangular subsections 418 illustrated in FIG. 4A may be used to generate a super-resolution image when the sensor subsections and lenses in wafer lens array 205 are facing substantially the same direction. To generate a super-resolution image, an shutter signal may be initiated to cause image sensor 201 to capture an image. Pixel data from the pixels in image sensor 201 can then be readout. A software algorithm may sort the pixel data to only include pixel data from the pixels in the nine rectangular subsets 418, generating nine images (each image including the pixel data from the rectangular subset 418 of the respective sensor subsection). These nine images can then be combined into a super-resolution image, using known algorithms. Because of the slight perspective differences due to the small physical separation of the sensor subsections, each of the nine images may have slightly different fields of view. To adjust for the different fields of view, each of the nine images may be cropped prior to combining the nine images into a super-resolution image to give each of the nine images the same field of view.

Considering the quantity of unlit pixels illustrated in FIG. 4A, it is clear that there are unused and wasted pixels (pixels not in rectangular subset 418) for generating super-resolution images. Furthermore, if the nine images are cropped to adjust for the slightly different fields of view of the nine images, more pixels are wasted. However, despite the wasted pixels, the embodiment illustrated in FIG. 4A has the advantage of a smaller Z axis dimension than conventional cameras.

The embodiment illustrated in FIG. 4B may decrease the quantity of pixels that are wasted in comparison to the embodiment illustrated in FIG. 4A. Like FIG. 4A, FIG. 4B illustrates image sensor 201 and its nine sensor subsections 311-319 being lit by their corresponding lenses in wafer lens array 205 focusing image light 199 onto their respective sensor subsections (e.g. fifth lens focuses image light 199 onto sensor subsection 315). The portion of each sensor subsection that is lit (i.e. pixel in the sensor subsection that receive image light 199 focused from their respective wafer lens in wafer lens array 205) is shown inside lens focus circle 459. The pixels that are lit in each sensor subsection are labeled as lit pixels 427. The portion of each sensor subsection that is not lit (i.e. pixel in the sensor subsection that do not receive image light 199 focused from their respective wafer lens in wafer lens array 205) is shown in black. Unlit pixels 426 are the pixels in each sensor subsection that are unlit. Rectangle subsection 428 is a rectangular subsection of lit pixels 427. The pixel in rectangular subsection 428 are arranged to capture images.

In FIG. 4B, lens focus circle 459 is comparatively larger than lens focus circle 458 illustrated in FIG. 4A because lens focus circle 459 is incident upon adjacent sensor subsections in addition to its respective sensor subsection. As an example, the lens in wafer lens array 205 that corresponds with sensor subsection 318 focuses image light 199 onto sensor subsection 318 as well as on adjacent sensor subsections 315, 317, and 319. And, since the other lenses in wafer lens array 205 are also configured to focus image light 199 onto adjacent sensor subsections, an overlapping border subset 429 is formed where the pixels in overlapping border subset 429 receive image light 199 from two adjacent lenses in wafer lens array 205. The lenses in the wafer lens array in FIG. 4B may have a wider field of view than the lenses in the wafer lens array illustrated in FIG. 4A to generate the larger lens focus area 459.

As can be seen in FIG. 4B, the effect of configuring the lenses in wafer lens array 205 to increase lens focus area 458 to lens focus area 459 also increases the size of rectangular subset 418 to rectangular subset 428. Therefore, the percentage of usable lit pixels on image sensor 201 is increased, contributing to higher resolution for the nine images generated to ultimately generate a super-resolution composite image. In one embodiment, lens focus area 459 is designed to maximize the sizes of rectangular subset 428. In one embodiment, overlapping lens focus area 459 halves the number of unusable pixels when compared to lens focus area 458. Of course, if the nine images that contribute to the super-resolution image have higher resolution, then the super-resolution image made from the nine images will have a higher resolution.

It is appreciated that the lenses in wafer lens array 205 may not focus image light 199 in a circular pattern as illustrated in FIGS. 4A and 4B. The lenses in wafer lens array 205 may be configured to focus image light 199 onto image sensor 201 in an oval shape, or otherwise. The lenses in lens array 205 may be configured to have overlapping fields of view. It is also appreciated that the examples described in connection with FIG. 4A and FIG. 4B can be modified for a wafer lens array with a different matrix size to generate a super-resolution image.

In on embodiment, outside lenses (e.g. first lens 212, second lens 222, and the third lens 232) are configured to have a field of view of 0° to 90° and outside lenses on an opposite side of a wafer lens array (e.g. the seventh lens 272, eighth lens 282, and ninth lens 292) are configured to have a field of view of 0° to −90°. First lens 212 and the seventh lens 272 may have red filters, second lens 222 and eighth lens 282 may have green filters, and the third lens 232 and ninth lens 292 may have blue filters to give each field of view a color image.

One potential advantage of using one standard image sensor (as compared with nine separate image sensors) in low-profile camera 201 is reduction of the software and processing complexity to manage nine separate image sensors. Using multiple discrete image sensors would also likely require a bigger footprint and more complex input/output ("I/O") connectivity, which may increase cost. Using only one image sensor allows for an existing interface to control the exposure time and line-by-line readout of the one image sensor to capture a plurality (e.g. nine) of images for generating a composite (e.g. super-resolution) image. Furthermore, as describe in connection with FIG. 4A, despite the wasted pixels, the embodiment illustrated in FIG. 4B has the advantage of a smaller Z axis dimension than conventional cameras. The Z axis dimension saving may be small enough to increase the depth of field of the lenses in wafer lens array 205 and still improve the Z axis dimension of low-profile camera 200 compared with conventional cameras.

Figure 5:
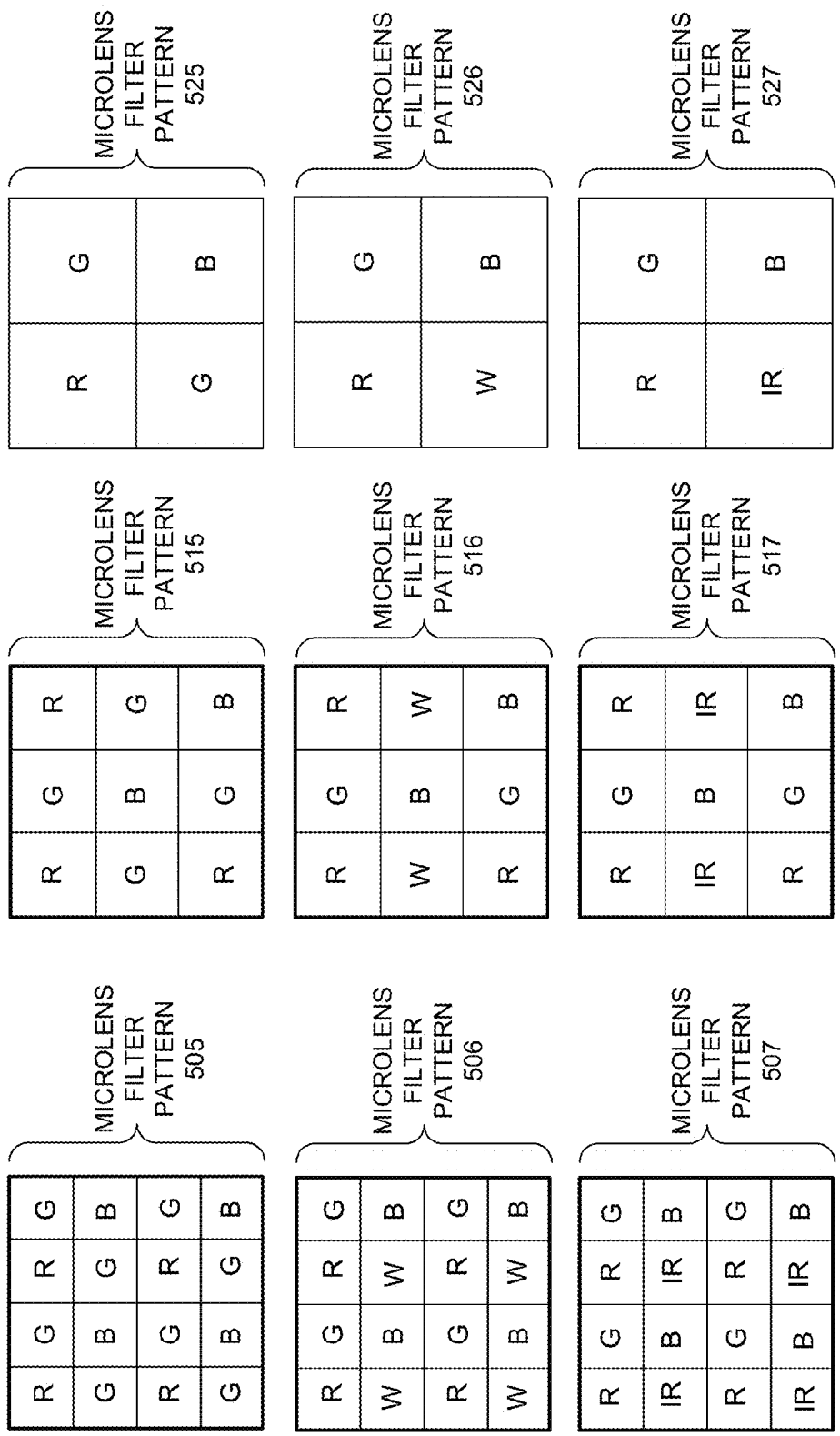
FIGS. 5A-5C illustrate possible microlens filter patterns, in accordance with an embodiment of the disclosure.

FIGS. 5A-5C illustrate possible microlens filter patterns ("MFPs"), in accordance with an embodiment of the disclosure. The MFPs in FIGS. 5A-5C may be incorporated into each lens in a wafer lens array. The wafer lens that the filters are incorporated into may be configured similarly to the wafer lens array discussed in connection with FIGS. 4A and 4B. The MFPs in FIG. 5A are for a 4×4 wafer lens array, the MFPs in FIG. 5B are for a 3×3 wafer lens array, and the MFPs in FIG. 5C are for a 2×2 wafer lens array. MFP 525 shows a Bayer pattern (Red, Green, Green, and Blue or "RGGB") and MFP 505 shows a Bayer pattern repeated four times. MFP 515 includes one Bayer pattern with additional color filters. MFPs 506, 516, and 526 show a Red ("R"), Green ("G"), White ("W"), and Blue ("B") pattern. MFPs 507, 517, and 527 show a Red ("R"), Green ("G"), infrared ("IR"), and Blue ("B") pattern. The filter designation of each filter denotes the color of light that the filter passes. For example, a Red filter passes red light, a green filter passes green light, a blue filter passes blue light, a white filter passes red, green, and blue light (or visible light in general), and an IR filter passes IR light, but may not pass visible light. The filters may be bandpass filters that pass a certain color of light, but generally do not pass other colors of light. Manufacturing bigger filters may be less costly than manufacturing a traditional color filter for a camera, which includes placing a filter over every pixel in an image sensor.

If MFP 525 is disposed over image sensor 201, the pixels in image sensor 201 would be partitioned into four sensor subsections, each capturing an image. The sensor subsection under the red filter would receive and capture the red light of a scene, the sensor subsections under the green filter would receive and capture the green light of a scene, and the sensor subsection under the blue filter would receive and capture the blue light of a scene. The four images could then be used to generate a full color super-resolution image. In MFP 526, the extra green filter is traded for a white filter that passes visible light, but may not pass IR light. The pixels in the sensor subsection under the white filter can be used to capture the overall intensity or brightness of the scene, while the other three sensor subsections capture the red, green, and blue light from the scene. In MFP 527, an IR filter passes the IR light, but filters out the visible light. The IR filter may be centered around a certain infrared wavelength that matches an IR illuminator (e.g. an IR light emitting diode "LED") that is connected to a camera in which image sensor 201 is disposed in. The pixels in the sensor subsection under the IR filter can be used to capture the IR light from a scene, while the other three sensor subsections capture the red, green, and blue light from the scene.

Figure 6:
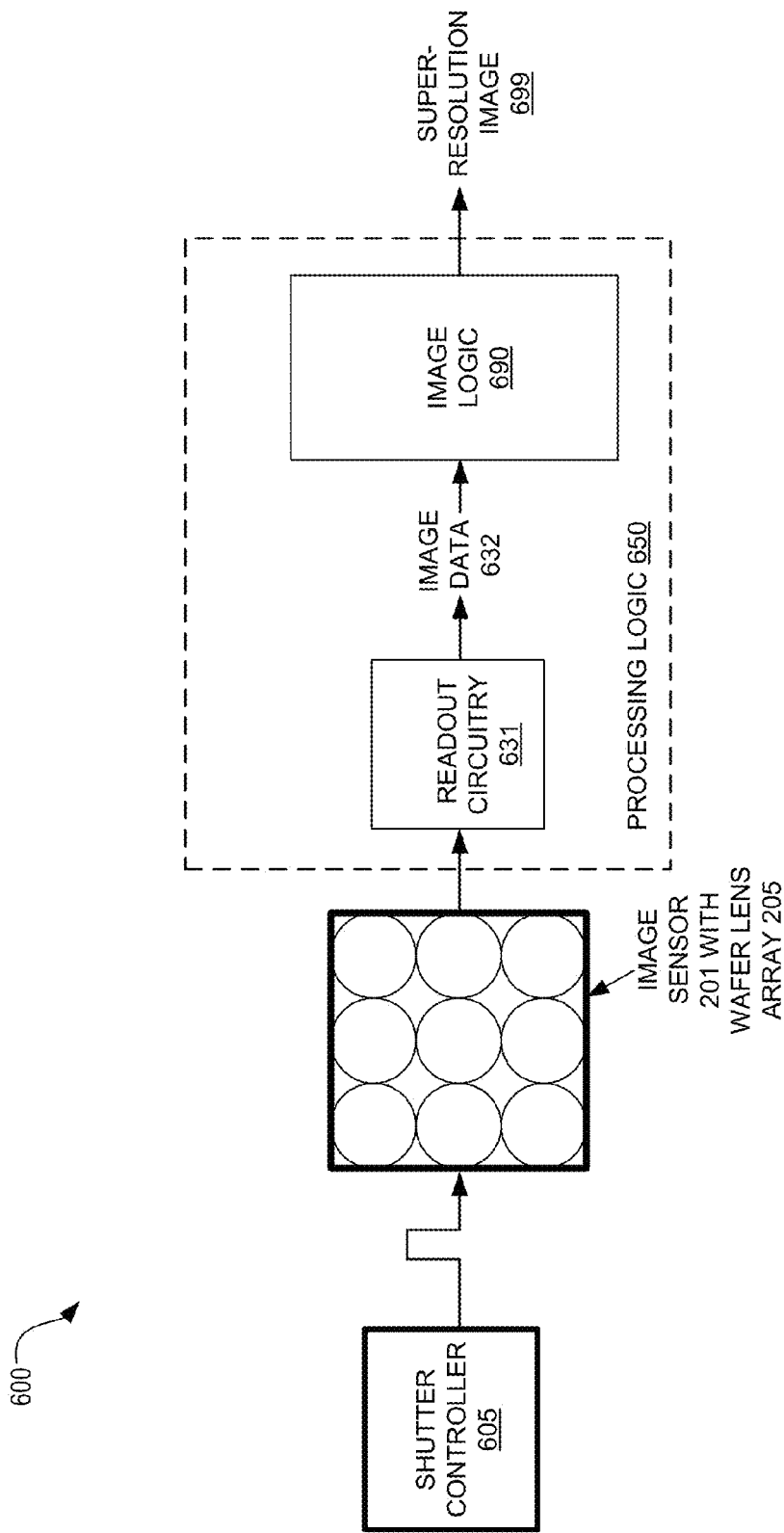
FIG. 6 shows a block diagram schematic of an imaging system that includes a wafer lens array positioned to focus image light onto sensor subsections of an image sensor, in accordance with an embodiment of the disclosure.

FIG. 6 shows a block diagram schematic of an imaging system 600 that includes wafer lens array 205 positioned to focus image light onto sensor subsections of image sensor 201, in accordance with an embodiment of the disclosure. Imaging system 600 also includes shutter controller 605 coupled to image sensor 201 to initiate an exposure period of the image pixels of image sensor 201. Processing logic 650 is coupled to image sensor 201 to receive image data from image sensor 201 and to generate at least one image (e.g. a super-resolution image). In the illustrated embodiment, processing logic 650 includes readout circuitry 631 to readout pixel signals from image sensor 201. Readout circuitry 631 sends the processed pixel signals to image logic 690 as image data 632. Image logic 690 may be configured to extract the desired pixel data (e.g. rectangular subsets 428) from image data 632, in order to generate a super-resolution image 699.

Readout circuitry 631 may include one or more analog-to-digital converters. Image logic 690 may include a processor, Field-programmable-gate-array ("FPGA"), or other logic. Image logic 690 may include a memory to store image data and super-resolution image 699.

In one embodiment, image sensor 201 is replaced with a high-dynamic-range ("HDR") image sensor configured to expose first selected pixels for a first integration period (e.g. 5 ms) and expose second selected pixels for a second integration period (e.g. 30 ms). Each sensor subsection of the HDR image sensor has a quantity of first pixel and quantity of second pixels. The first pixels may be in first lines (columns or rows) and the second pixels may be in second lines (columns or rows) of the HDR image sensor. The first lines may be interlaced with the second lines in an every-other configuration. The first pixels and the second pixels may measure image light for different integration times. Shutter controller 605 may initiate the first and second integration period at the same time, but the first integration period may be shorter than the second integration period. With the shorter integration period, the first pixels will measure fewer photons from image light. When the HDR image sensor is readout, the image date from each sensor subsection will include shorter and longer exposure data. Having image data from shorter and longer integration periods may be used to create a composite HDR image from the different sensor subsections that increases the dynamic range between the lightest and darkest sectors of the image.

Figure 7:
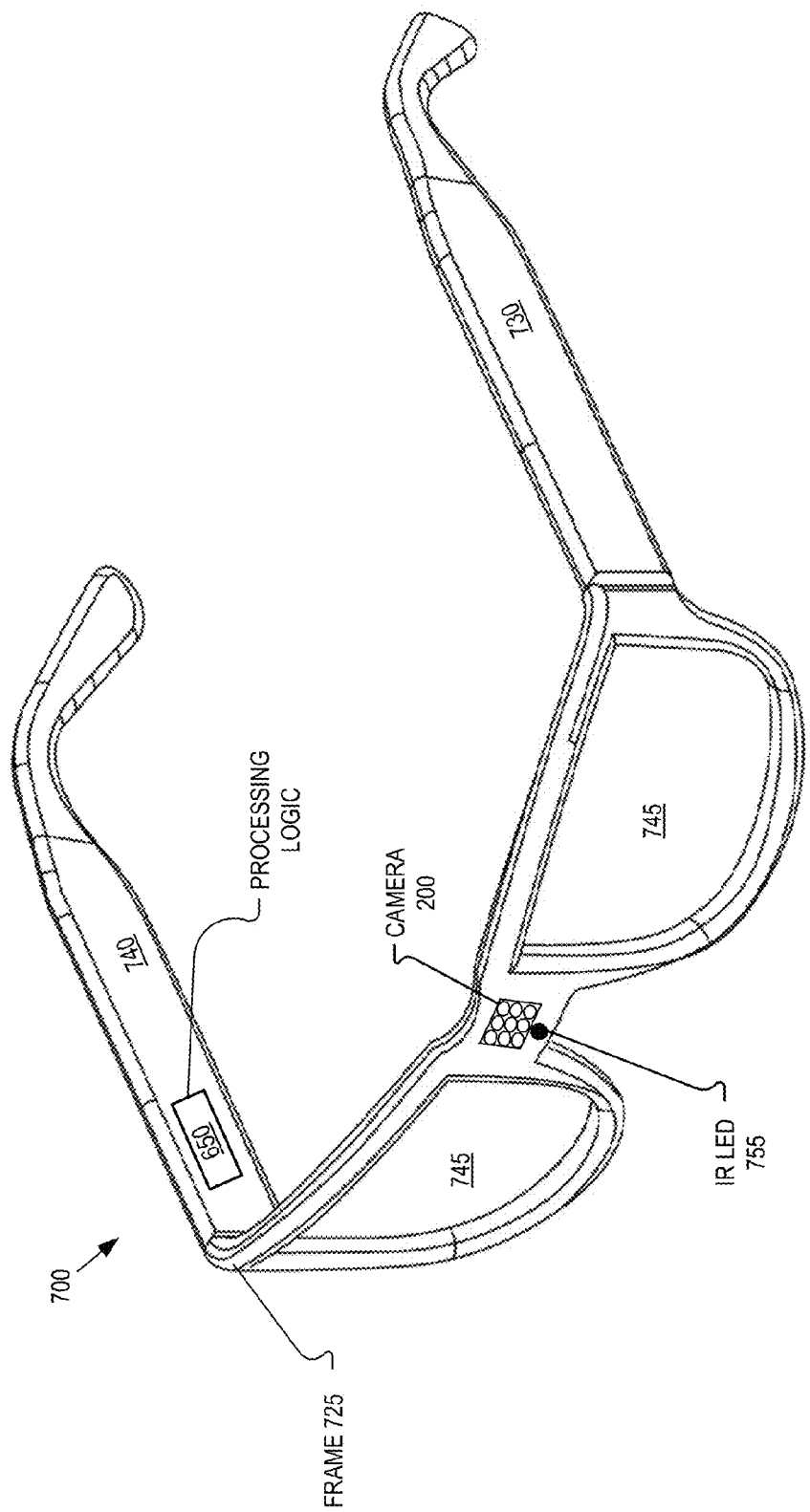
FIG. 7 is a perspective view of example wearable glasses that include a low-profile camera and electronic components to facilitate human-computer interaction, in accordance with an embodiment of the disclosure.

FIG. 7 is a perspective view of example wearable glasses 700 that include a low-profile camera 200 and electronic components to facilitate human-computer interaction, in accordance with an embodiment of the disclosure. An HMD is a display device worn on or about the head. HMDs usually incorporate some sort of near-to-eye optical system to emit a light image within a few centimeters of the human eye. The illustrated embodiment of wearable glasses 700 includes lenses 745 disposed in frame 725 that includes left temple arm 730 and right temple arm 740. Although FIG. 3 illustrates a traditional eyeglass frame 725, embodiments of the present invention are applicable to a wide variety of frame types and styles (e.g. visor, headband, goggles). Traditional eyeglass frame 725 may have a slim frame that limits the amount of space to place a conventional camera.

In the illustrated embodiment, low-profile camera 200 is mounted in the center of a frame 725 of wearable glasses 700, on or about the nose-piece. In the illustrated embodiment, an IR LED 755 is mounted in the bridge or noise-piece of wearable glasses 700. IR LED 755 may be used to illuminate a photography subject to be imaged by low-profile camera 200. IR LED may be used in connection with MFPs 525, 526, or 527. IR LED may emit IR light and camera 200 may image the emitted IR light reflected off of a subject (e.g a hand) to decipher how close the hand is, as a way to measure depth. Multiple images of reflected IR light can be the basis for motion or even gesturing detection.

In one embodiment, two low-profile cameras 200 are disposed on wearable glasses 700. Wearable glasses 700 may include processing logic 650 disposed in right arm 740. Processing logic 650 may include an integrated circuit with hardware, firmware, and/or software logic. Processing logic 650 may be used to receive, transmit, and process data. Processing logic 650 may receive and process image data and generate images based on software algorithms. Processing logic 650 may be located in a location or locations other than in right temple arm 340, such as in left temple arm 730.

With regard to low-profile camera 200 in HMD 700, it desirable to have a large depth of field for camera 200 because a user/wearer of HMD 700 may not spend time to focus the picture. As mentioned above, using wafer lens technology in wafer lens array 205 may give low-profile camera 200 a substantially smaller Z axis dimension than a conventional camera. Some of this savings in the Z axis may be used to construct a wafer lens array that gives camera 200 a large depth of field, which will help capture images that are in focus.

Figure 8:
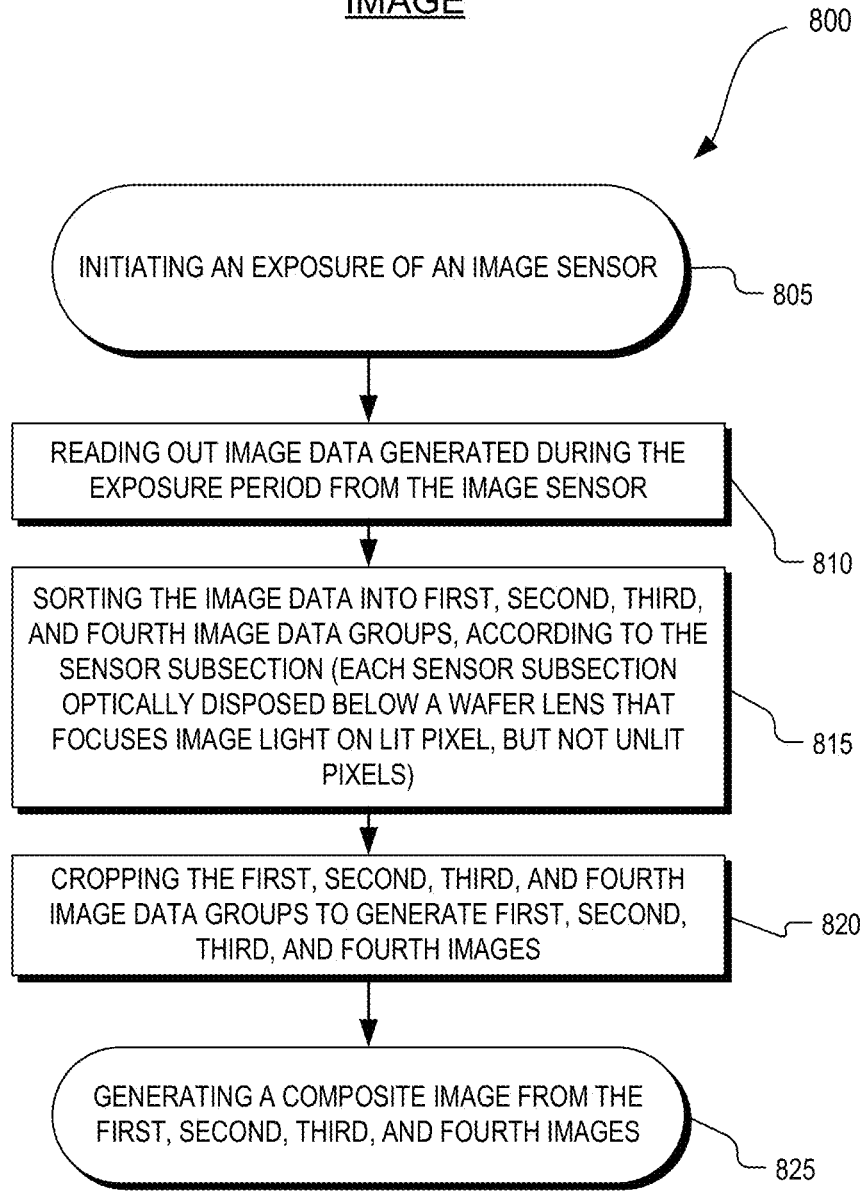
FIG. 8 is a flow chart illustrating an example process of generating an image, in accordance with an embodiment of the disclosure.

FIG. 8 is a flow chart illustrating an example process 800 of generating an image, in accordance with an embodiment of the disclosure. The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel.

In process block 805, an exposure period of an image sensor is initiated to allow image pixels of the image sensor to measure image light. For example, shutter controller 605 may initiate an exposure period (a.k.a. integration period) of image sensor 201. After measuring the image light, image data measured during the exposure period is read out from the image sensor in process block 810. In process block 815, the image data is sorted into first, second, third, and fourth image data groups. If an HDR image sensor is used (such as the one discussed in connection with FIG. 6), each image data group may contain image data from pixels within the same sensor subsection that have different exposure periods. The image data groups correspond with the sensor subsections disposed below wafer lenses of the image sensor. For example, the pixels in a fourth sensor subsection disposed below a fourth wafer lens in a wafer lens array will generate the data for the fourth image data group. The number of image data groups will vary depending on the configuration of the wafer lens array. If the wafer lens array includes nine lenses, then the image data may be sorted into nine image data groups from the nine sensor subsections that the image sensor would be partitioned into. The wafer lens array and sensor subsections may be configured as discussed above in connection with FIGS. 4A and 4B, where each sensor subsection includes unlit pixels and lit pixels.

In process block 820, the first, second, third, and fourth image data groups are formatted (e.g. cropped) to generate first, second, third, and fourth images. Each image data groups may be cropped to generate a rectangular image that does not include unlit pixels. The image data groups may also be cropped to generate the largest rectangular image that does not include unlit pixel and that also has a common field of view with the other sensor subsections. As discussed above, the sensor subsections may have different fields of view due to the slightly different physical location of the sensor subsections. However, their fields of view may at least partially overlap giving them a common field of view. A composite image is generated from the first, second, third, and fourth images, in process block 825. The composite image may be a super-resolution image.

One potential feature of low-profile camera 200 is capturing images (with different sensor subsection) that are from slightly different perspectives. Using trigonometry in accordance with the principles of parallax, the distance to an subject/object imaged by camera 200 may be determined by analyzing two images captured by different sensor subsections. For example, an image from one sensor subsection may be compared with an image from another sensor subsection. A common point in each image can be determined by matching edges or corners. Then, an angle(s) of the incoming light can be determined based on which pixel in each image that that common point appears in. The angles are determined, at least in part on how far away the pixels are from each other in the image sensor. The depth information that can be calculated using parallax principles can be useful in gesture detection (e.g. isolating the image of a hand against a background).

The principles of parallax as applied to using camera 200 may also be useful for after-capture-focusing of an image generated by camera 200 (super-resolution or otherwise). Since the angle of image light incident on a pixel can be determined using trigonometry related to how far apart the pixels from different subsections are, a four dimensional ("4-D") light field can be generated. With the distance of objects in the image also known based on trigonometry, after-capture-focusing can be applied to an image. In one example, image blur is applied to an image based on a calculated distance of objects in the image. In this way, a captured image that is generally in focus (as a result of the large depth of field of the wafer lenses) can have artistic blur correctly added to selected portions of the image (e.g. blurring out objects in an image more than 40 feet from the camera to blur the background). Different scales or layers of blurring may be added to a captured images based on the depth of the object from the camera. In one embodiment, the calculations and after-capture-focusing are completed by processing logic 650.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An imaging device comprising:
an image sensor having rows and columns of image pixels partitioned into an array of sensor subsections; and
an array of wafer lenses disposed over the image sensor, the array of wafer lenses comprising:
a first wafer lens optically positioned to focus first image light onto a first sensor subsection of the array of sensor subsections, wherein the first sensor subsection includes first image pixels each located directly under the first wafer lens, the first image pixels comprising any pixel configured to receive via the first wafer lens a respective portion of the first image light, wherein, of the first image pixels, only a first rectangular subset of the first image pixels is configured to capture images; and
a second wafer lens optically positioned to focus second image light onto a second sensor subsection of the array of sensor subsections, wherein the second sensor subsection includes second image pixels each located directly under the second wafer lens, the second image pixels comprising any pixel configured to receive via the second wafer lens a respective portion of the second image light, wherein, of the second image pixels, only a second rectangular subset of the second image pixels is configured to capture images;
wherein the first sensor subsection and the second sensor subsection comprise third image pixels other than any image pixels that are to receive focused light from the array of wafer lenses, wherein the third image pixels are between the first image pixels and the second image pixels.

2. The imaging device of claim 1, wherein the first sensor subsection and the second sensor subsection include fourth image pixels each to receive via the first wafer lens a respective portion of the first image light, wherein the fourth image pixels are each to further receive via the second wafer lens a respective portion of the second image light.

3. The imaging device of claim 1, wherein the first sensor subsection is optically coupled to receive a first color light passed by a first color filter disposed over a majority of the first sensor subsection, wherein the second sensor subsection is optically coupled to receive a second color light passed by a second color filter disposed over a majority of the second sensor subsection, and a third sensor subsection of the array of sensor subsections is optically coupled to receive a third color light passed by a third color filter disposed over a majority of the third sensor subsection.

4. The imaging device of claim 3, wherein the first color light is red, the second color light is green, and the third color light is blue.

5. The imaging device of claim 4, wherein a fourth sensor subsection of the array of sensor subsections is optically coupled to receive the second color light passed by a green filter disposed over a majority of the fourth sensor subsection.

6. The imaging device of claim 4, wherein a fourth sensor subsection of the array of sensor subsections receives infrared ("IR") light passed by an IR filter disposed over a majority of the fourth sensor subsection, the IR filter configured to substantially pass IR light and to substantially block visible light.

7. The imaging device of claim 1, wherein first columns of the columns of the image sensor are interlaced with second columns of the columns of the image sensor, wherein the first columns are coupled to be exposed for a first exposure period and the second columns are coupled to be exposed for a second exposure period, the first columns coupled to be readout to generate first image data and the second columns to be readout to generate second image data.

8. The imaging device of claim 1, wherein a shape of the first image light focused by the first wafer lens onto the first sensor subsection substantially maximizes an area of the first rectangular subset of the first image pixels.

9. A system comprising:
an image sensor having rows and columns of image pixels partitioned into an array of sensor subsections;
an array of wafer lenses disposed over the image sensor, the array of wafer lenses comprising:
a first wafer lens optically positioned to focus first image light onto a first sensor subsection of the array of sensor subsections, wherein the first sensor subsection includes first image pixels each located directly under the first wafer lens, the first image pixels comprising any pixel configured to receive via the first wafer lens a respective portion of the first image light, wherein, of the first image pixels, only a first rectangular subset of the first image pixels is configured to capture images; and
a second wafer lens optically positioned to focus second image light onto a second sensor subsection of the array of sensor subsections, wherein the second sensor subsection includes second image pixels each located directly under the second wafer lens, the second image pixels comprising any pixel configured to receive via the second wafer lens a respective portion of the second image light, and wherein, of the second image pixels, only a second rectangular subset of the second image pixels is configured to capture images;
wherein the first sensor subsection and the second sensor subsection comprise third image pixels other than any image pixels that are to receive focused light from the array of wafer lenses, wherein the third image pixels are between the first image pixels and the second image pixels;
shutter control circuitry coupled to the image sensor to initiate an exposure period; and
processing logic coupled to the image sensor to receive image data from the image sensor and to generate at least one image from the image data.

10. The system of claim 9, wherein the first sensor subsection and the second sensor subsection include fourth image pixels each to receive via the first wafer lens a respective portion of the first image light, wherein the fourth image pixels are each to further receive via the second wafer lens a respective portion of the second image light.

11. The system of claim 9, wherein the first sensor subsection is optically coupled to receive a first color light passed by a first color filter disposed over a majority of the first sensor subsection, wherein the second sensor subsection of the array of sensor subsections is optically coupled to receive a second color light passed by a second color filter disposed over a majority of the second sensor subsection, and a third sensor subsection of the array of sensor subsections is optically coupled to receive a third color light passed by a third color filter disposed over a majority of the third sensor subsection.

12. The system of claim 11, wherein the first color light is red, the second color light is green, and the third color light is blue.

13. The system of claim 12, wherein a fourth sensor subsection of the array of sensor subsections is optically coupled to receive the second color light passed by a green filter disposed over a majority of the fourth sensor subsection.

14. The system of claim 12, wherein a fourth sensor subsection of the array of sensor subsections is optically coupled to receive infrared ("IR") light passed by an IR filter disposed over a majority of the fourth sensor subsection, the IR filter configured to substantially pass IR light and to substantially block visible light.

15. The system of claim 9, wherein first columns of the columns of the image sensor are interlaced with second columns of the columns of the image sensor, wherein the first columns are coupled to the shutter circuitry to be exposed for a first exposure period and the second columns are coupled to the shutter circuitry to be exposed for a second exposure period, the first columns coupled to be readout to generate first image data and the second columns to be readout to generate second image data.

16. The system of claim 9, wherein a shape of the first image light focused by the first wafer lens onto the first sensor subsection substantially maximizes an area of the first rectangular subset.

17. The system of claim 9 further comprising a head mounted display ("HMD"), wherein the image sensor, the array of wafer lenses, the shutter circuitry and the processing circuitry are disposed on the HMD, and wherein the image sensor and array of wafer lenses are positioned forward-facing.

18. The system of claim 17 further comprising an infrared illuminator coupled to emit infrared ("IR") light in a direction substantially normal to the image sensor, and wherein at least one sensor subsection of the array of sensor subsections is optically coupled to receive the IR light emitted by the infrared illuminator after the IR light is reflected by a subject and passed by an IR filter disposed over a majority of the at least one sensor subsection, the IR light emitted by the infrared illuminator substantially at a certain frequency and the IR filter configured to substantially pass light centered around the certain frequency.

19. A method of generating an image comprising:
    initiating an exposure of an image sensor having rows and columns of image pixels partitioned into an array of sensor subsections, the array of sensor subsections including a first sensor subsection and a second sensor subsection, wherein, in response to the initiating:
        first image light is focused, by a first wafer lens of an array of wafer lenses, onto a first sensor subsection of the array of sensor subsections, wherein first image pixels of the first sensor subsection are each located directly under the first wafer lens, the first image pixels comprising any pixel that receives via the first wafer lens a respective portion of the first image light, wherein, of the first image pixels, only a first rectangular subset of the first image pixels is configured to capture images; and
        second image light is focused, by a second wafer lens array of wafer lenses, onto a second sensor subsection of the array of sensor subsections, wherein second image pixels of the second sensor subsection are each located directly under the second wafer lens, the second image pixels comprising any pixel that receives via the second wafer lens a respective portion of the second image light, wherein, of the second image pixels, only a second rectangular subset of the second image pixels is configured to capture images;
    wherein the first sensor subsection and the second sensor subsection comprise third image pixels other than any image pixels that are to receive focused light from the array of wafer lenses, wherein the third image pixels are between the first image pixels and the second image pixels;
    reading out image data generated during the exposure from the image sensor;
    sorting the image data into image data groups including a first image data group and a second image data group from the first sensor subsection and the second sensor subsection, respectively;
    cropping the first image data group and the second image data group to generate a first image and a second image;
    generating a composite image from the first image and the second image.

20. The method of claim 19, wherein generating the composite image includes performing a super-resolution algorithm on the first image and the second image.

21. The method of claim 19, wherein the first image and the second image are cropped to have the same field of view.

22. The method of claim 19, wherein initiating the exposure of the image sensor includes exposing first columns of image pixels of the image sensor for a first exposure period and exposing second columns of image pixels of the image sensor for a second exposure, and wherein each of the first image data group and the second image data group includes short exposure image data from the first columns and long exposure image data from the second columns.

23. The method of claim 19 further comprising:
    generating a 4-D light field from the first image data group and the second image data group; and
    refocusing the composite image using the 4-D light field.

* * * * *